(12) United States Patent
Lee et al.

(10) Patent No.: US 8,939,596 B2
(45) Date of Patent: Jan. 27, 2015

(54) CONDENSING TYPE OPTICAL SHEET

(75) Inventors: Hyun Soo Lee, Seoul (KR); Chang Pyo Hong, Yongin-si (KR); Chung Seock Kang, Yongin-si (KR)

(73) Assignee: Kolon Industries, Inc., Gwacheon-si (KR)

( * ) Notice: Subject to any disclaimer, the term of this patent is extended or adjusted under 35 U.S.C. 154(b) by 113 days.

(21) Appl. No.: 13/386,606

(22) PCT Filed: Jul. 28, 2010

(86) PCT No.: PCT/KR2010/004963
§ 371 (c)(1),
(2), (4) Date: Jan. 23, 2012

(87) PCT Pub. No.: WO2011/014006
PCT Pub. Date: Feb. 3, 2011

(65) Prior Publication Data
US 2012/0127698 A1    May 24, 2012

(30) Foreign Application Priority Data
Jul. 29, 2009    (KR) .......................... 10-2009-0069410

(51) Int. Cl.
*G09F 13/04*    (2006.01)
*G09F 13/08*    (2006.01)
*G02B 5/04*    (2006.01)
*G02B 5/02*    (2006.01)
*G02F 1/1335*    (2006.01)

(52) U.S. Cl.
CPC .............. *G02B 5/045* (2013.01); *G02B 5/0215* (2013.01); *G02F 2001/133607* (2013.01)
USPC ..... 362/97.2; 362/610; 362/628; 362/311.01; 359/619

(58) Field of Classification Search
USPC ............... 362/97.1, 97.2, 620, 622, 610, 628, 362/311.06, 311.01; 359/619
See application file for complete search history.

(56) References Cited

U.S. PATENT DOCUMENTS

| | | | |
|---|---|---|---|
| 8,760,766 B2* | 6/2014 | Fujikawa | 359/630 |
| 2006/0126174 A1* | 6/2006 | Gibilini | 359/460 |
| 2006/0164864 A1* | 7/2006 | Arihara | 362/621 |
| 2008/0130286 A1* | 6/2008 | Hartter et al. | 362/268 |
| 2008/0259243 A1 | 10/2008 | Ohta et al. | |
| 2009/0122229 A1* | 5/2009 | Kim et al. | 349/65 |

FOREIGN PATENT DOCUMENTS

| | | |
|---|---|---|
| JP | 2008-122525 A | 5/2008 |
| KR | 10-2006-0092501 A | 8/2006 |
| KR | 10-0802998 B1 | 2/2008 |

* cited by examiner

*Primary Examiner* — Anh Mai
*Assistant Examiner* — Jessica M Apenteng
(74) *Attorney, Agent, or Firm* — Sughrue Mion, PLLC (57) ABSTRACT

Disclosed is a condensing type optical sheet for use in a liquid crystal display, which prevents the generation of a yellow band or a rainbow phenomenon without using a protective sheet.

17 Claims, 9 Drawing Sheets

CONDENSING TYPE OPTICAL SHEET

CROSS REFERENCE TO RELATED APPLICATIONS

This application is a National Stage of International Application No. PCT/KR2010/004963 filed Jul. 28, 2010, claiming priority based on Korean Patent Application No. 10-2009-0069410 filed Jul. 29, 2009 the contents of all of which are incorporated herein by reference in their entirety.

TECHNICAL FIELD

The present invention relates to a condensing type optical sheet for use in a liquid crystal display.

BACKGROUND ART

Alongside the development of our industrial society into the advanced information age, the importance of electronic displays which are a medium for displaying and transferring various pieces of information is increasing day by day. Conventionally, cathode ray tubes (CRTs) were widely used therefor but limitations are imposed on the use thereof as a result of the space required to mount them, thus making it difficult to manufacture CRTs of larger sizes, and accordingly CRTs are being replaced by various types of flat panel displays, including liquid crystal displays (LCDs), plasma display panels (PDPs), field emission displays (FEDs), and organic electroluminescence (EL) displays. Among such flat panel displays, LCDs in particular are technologically intensive products resulting from a combination of liquid crystal-semiconductor techniques and are advantageous because they are slim and lightweight and consume little power. Therefore, research and development into LCD structures and manufacturing techniques is ongoing. Nowadays, LCDs, which have already been applied to fields such as notebook computers, monitors for desktop computers, portable personal communication devices (including personal digital assistants (PDAs) and mobile phones) and so on, are being manufactured in larger sizes, and thus it is possible to apply LCDs to large-sized televisions such as high-definition (HD) televisions. As a result, LCDs are receiving attention as novel displays able to substitute for CRTs, a term which used to be synonymous with displays.

In LCDs, because the liquid crystals themselves cannot emit light, an additional light source is provided at the back surface thereof so that the intensity of light passing through the liquid crystals in each pixel is controlled to obtain contrast. More specifically, the LCD, serving as a device for adjusting light transmittance using the electrical properties of a liquid crystal material, emits light from a light source lamp mounted to the back surface thereof, and the light thus emitted is passed through various functional prism films or sheets to thus impart the light with uniformity and directionality, after which such controlled light is also passed through a color filter, thereby obtaining red, green, and blue (R, G, B) colors. Furthermore, the LCD uses indirect light emission in which an image is displayed by controlling the contrast of each pixel via electrical methods. As such, a light-emitting device supplying a light source is an important component for determining the quality of the image of the LCD, including luminance and uniformity.

Such a light-emitting device is mainly exemplified by a backlight unit (BLU). Typically, light emitted from a plurality of light sources including a cold cathode fluorescent lamp (CCFL) is sequentially passed through a diffusion plate, a diffusion sheet and a prism sheet, and then reaches a liquid crystal panel. The diffusion sheet plays a role in attaining uniform light intensity over the entire front surface of a screen and simultaneously performs a hiding function so that a device such as the light source mounted under the diffusion sheet is not visible from the front surface. The prism sheet functions to control the path of light so that light rays directed in various directions having passed through the diffusion sheet are transformed within a range of viewing angles $\theta$ suitable for enabling the image to be viewed by an observer.

However, in the course of condensing the light, which was emitted from the light source and diffused via the diffusion sheet, by the prism sheet, some light which is incident only in the range of a predetermined angle can be condensed, and other light which is not condensed is lost or re-condensed. As such, a yellow band may be generated at an intersection between the condensed area and the lost area on the prism sheet, and also, a rainbow phenomenon showing waves of rainbow colors may be generated at the lost area and the re-condensed area on the prism sheet, undesirably causing defects.

In order to solve such problems, a protective sheet has been conventionally layered on the prism sheet, but the use thereof has become limited because of the recent trend to reduce the number of sheets to make the display slimmer and simplify the manufacturing process.

Therefore, methods able to prevent the generation of the yellow band or rainbow phenomenon without the use of the protective sheet are required.

DISCLOSURE

Technical Problem

Accordingly, the present invention is intended to provide a condensing type optical sheet, which is able to prevent the generation of a yellow band or a rainbow phenomenon without using a protective sheet.

Technical Solution

A first preferred embodiment of the present invention provides a condensing type optical sheet, comprising a substrate layer and a structural layer formed on one surface or both surfaces of the substrate layer and having an array of a plurality of three-dimensional (3D) structures, wherein each of the 3D structures of the structural layer includes slope portions extending in opposite directions from one peak point in which the slope portions are streamlined when viewed in longitudinal cross-section, and the slope portions are symmetrical or asymmetrical to the peak point and comprise part of a circumference of a first imaginary circle and part of a circumference of a second imaginary circle, the first imaginary circle and the second imaginary circle overlapping each other.

A second preferred embodiment of the present invention provides a condensing type optical sheet, comprising a substrate layer and a structural layer formed on one surface or both surfaces of the substrate layer and having an array of a plurality of 3D structures, wherein each of the 3D structures of the structural layer includes a peak portion having one peak point and slope portions extending in opposite directions from the peak portion in which the peak portion and the slope portions are streamlined when viewed in longitudinal cross-section, the slope portions are symmetrical or asymmetrical to the peak point and comprise part of a circumference of a first imaginary circle and part of a circumference of a second imaginary circle, the first imaginary circle and the second imaginary circle overlapping each other, and the peak portion comprises part of a circumference of a third imaginary circle which is adjacent to the circumference of the first imaginary circle and to the circumference of the second imaginary circle while being included in an overlapping region of the first imaginary circle and the second imaginary circle.

In the first and second embodiments, the 3D structures of the structural layer may have a width corresponding to $\frac{1}{10}$~1 of a maximum length between the circumferences at the overlapping region of the first imaginary circle and the second imaginary circle as viewed in a direction perpendicular to an imaginary line connecting two intersections of the first imaginary circle and the second imaginary circle.

In the first and second embodiments, the maximum length between the circumferences at the overlapping region of the first imaginary circle and the second imaginary circle as viewed in a direction perpendicular to the imaginary line connecting the two intersections of the first imaginary circle and the second imaginary circle may be 50~1000 μm.

In the first and second embodiments, the 3D structures of the structural layer may have a height corresponding to $\frac{1}{20}$~$\frac{1}{2}$ of a length of the imaginary line connecting the two intersections of the first imaginary circle and the second imaginary circle.

In the first and second embodiments, the length of the imaginary line connecting the two intersections of the first imaginary circle and the second imaginary circle may be 1~1000 μm.

In the second embodiment, the peak portion may be connected with the slope portions, and the third imaginary circle may have a diameter of 50 μm or less.

In the first and second embodiments, the 3D structures of the structural layer may have a linear array or a non-linear array.

In the first and second embodiments, the substrate layer may be formed using a resin selected from among a polyethyleneterephthalate resin, a polymethylmethacrylate resin, a polycarbonate resin, a polypropylene resin, a polyethylene resin, a polystyrene resin, and a styrene-acrylic copolymer resin.

In the first and second embodiments, the structural layer may be formed using a resin selected from among polymer resins including UV curable resins and thermosetting resins.

A third preferred embodiment of the present invention provides a backlight unit (BLU) assembly, comprising a diffusion sheet; and the condensing type optical sheet according to the first and second embodiments.

BEST MODE

Hereinafter, a detailed description will be given of the present invention.

Figure 1:
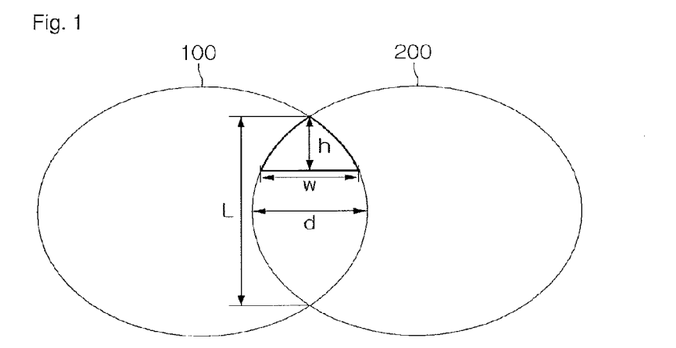
FIG. 1 is a view showing the shape of 3D structures of a condensing type optical sheet according to a preferred embodiment of the present invention.
Figure 2:
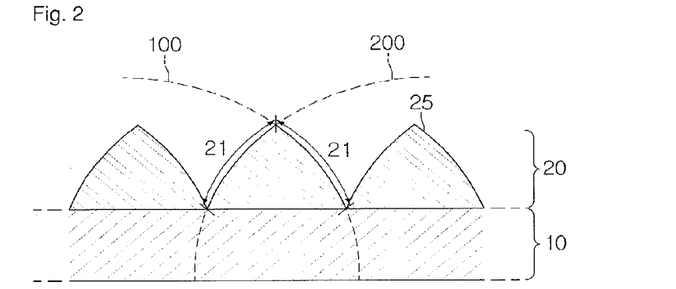
FIG. 2 is a cross-sectional view showing the condensing type optical sheet including the 3D structures having the shape of FIG. 1.
Figure 3:
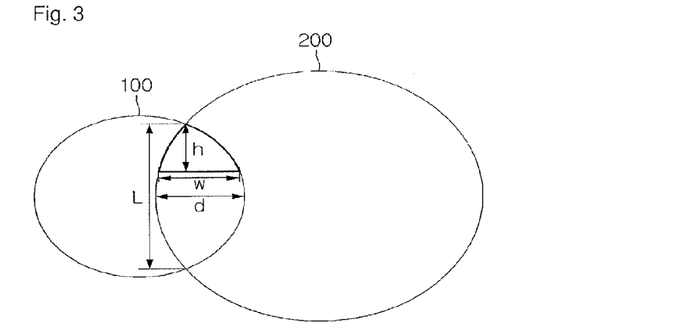
FIG. 3 is a view showing the shape of 3D structures of a condensing type optical sheet according to another preferred embodiment of the present invention.
Figure 4:
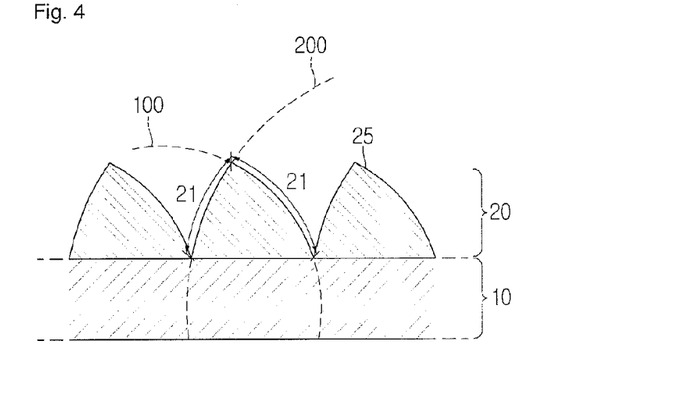
FIG. 4 is a cross-sectional view showing the condensing type optical sheet including the 3D structures having the shape of FIG. 3.
Figure 5:
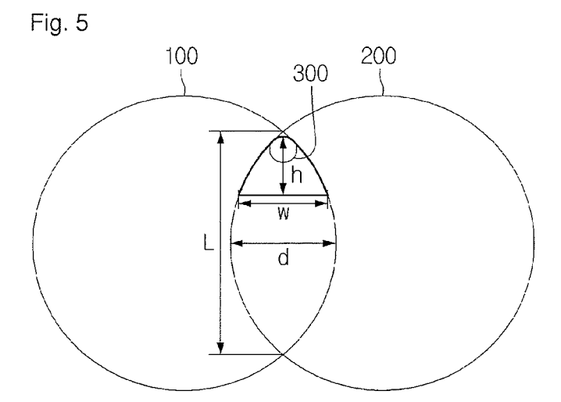
FIG. 5 is a view showing the shape of 3D structures of a condensing type optical sheet according to a further preferred embodiment of the present invention.
Figure 6:
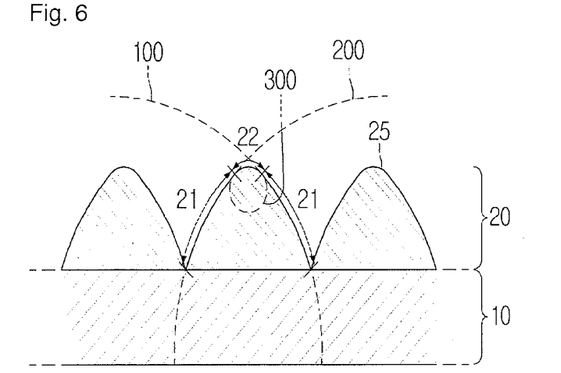
FIG. 6 is a cross-sectional view showing the condensing type optical sheet including the 3D structures having the shape of FIG. 5.
Figure 7:
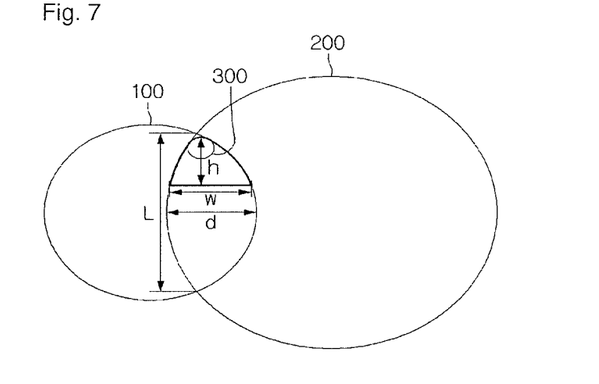
FIG. 7 is a view showing the shape of 3D structures of a condensing type optical sheet according to yet another preferred embodiment of the present invention.
Figure 8:
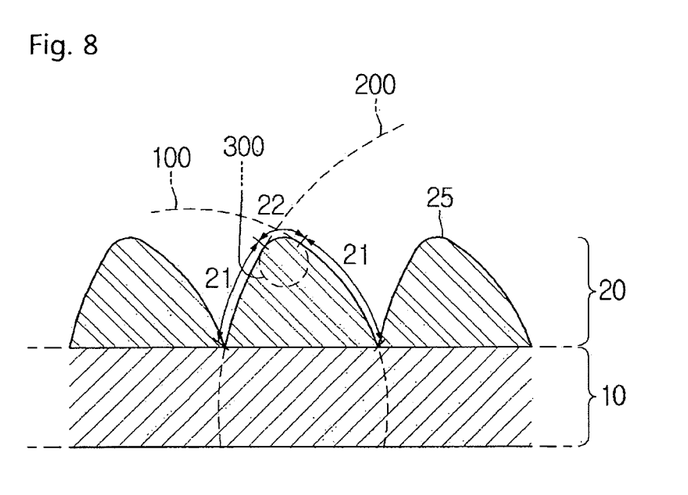
FIG. 8 is a cross-sectional view showing the condensing type optical sheet including the 3D structures having the shape of FIG. 7.
Figure 9:
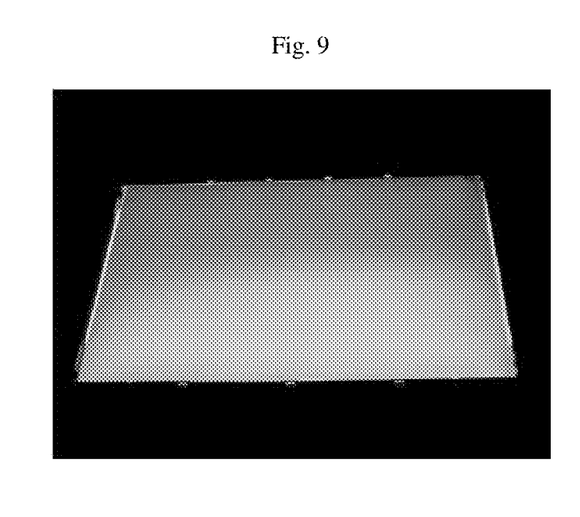
FIG. 9 is a photograph showing a yellow band and rainbow observed when using the condensing type optical sheet of Example 1.
Figure 10:
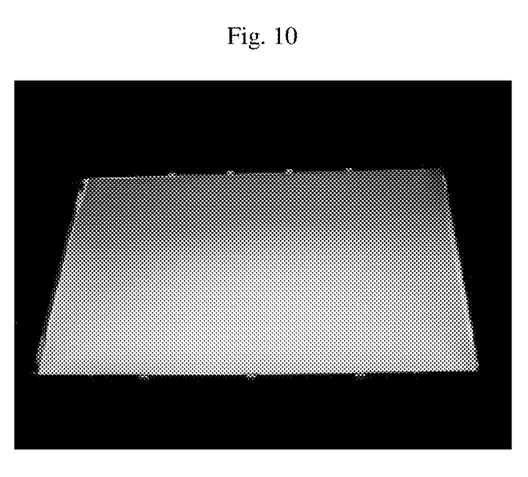
FIG. 10 is a photograph showing a yellow band and rainbow observed when using the condensing type optical sheet of Example 3.
Figure 11:
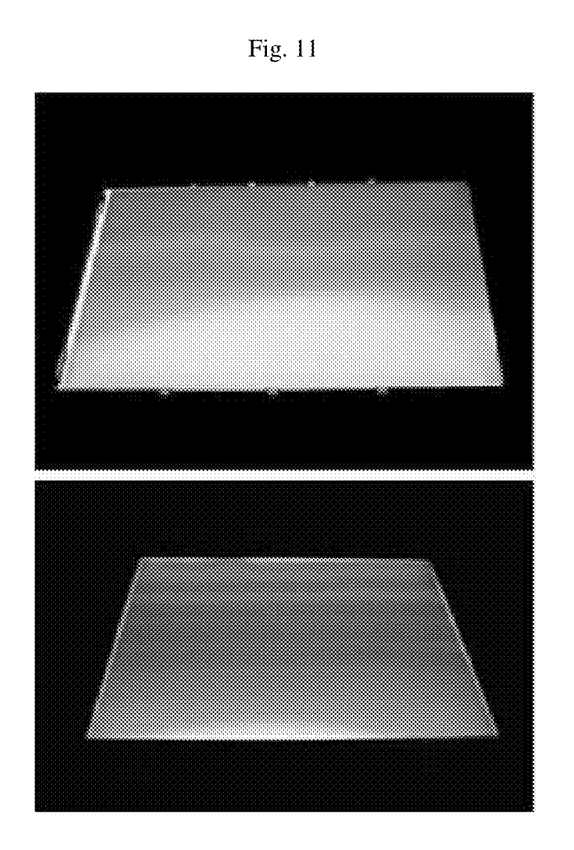
FIG. 11 is a photograph showing a yellow band and rainbow observed when using the condensing type optical sheet of Comparative Example 1.
Figure 12:
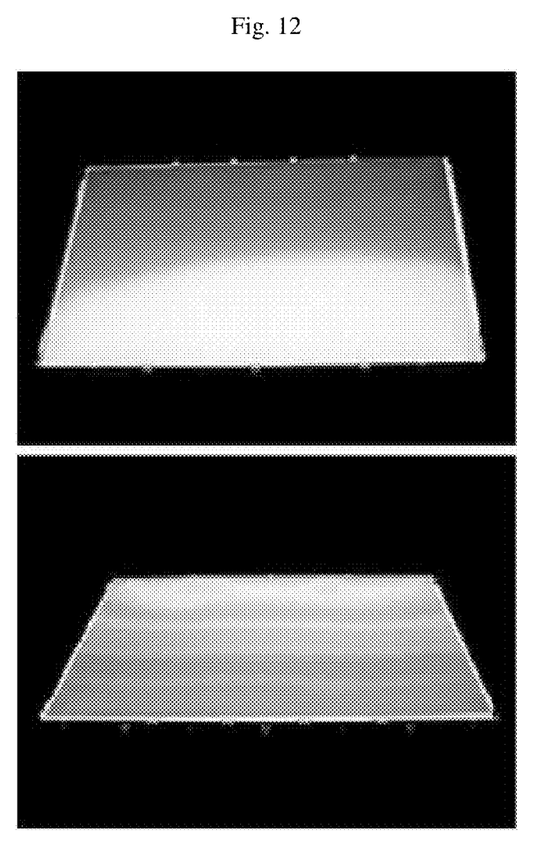
FIG. 12 is a photograph showing a yellow band and rainbow observed when using the condensing type optical sheet of Comparative Example 2.
Figure 13:
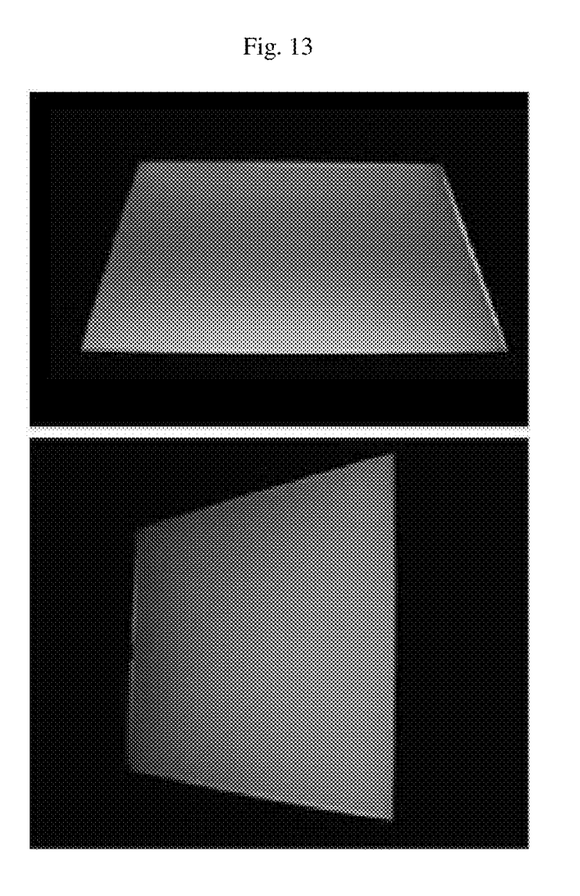
FIG. 13 is a photograph showing a yellow band and rainbow observed when a protective sheet is further layered on the condensing type optical sheet of Comparative Example 2.
Figure 14:
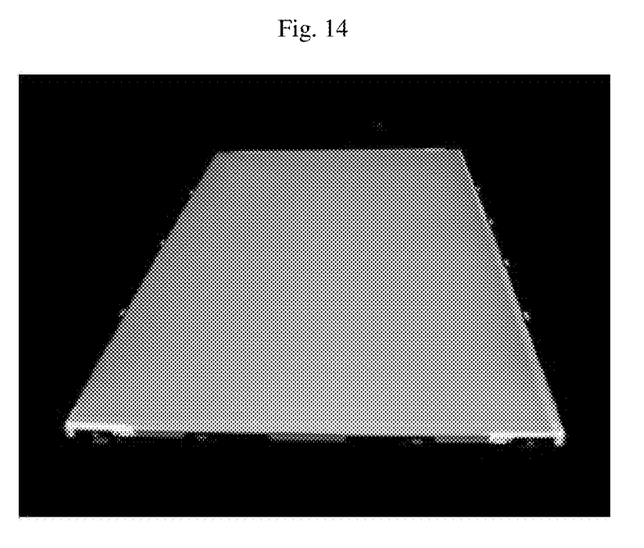
FIG. 14 is a photograph showing a yellow band and rainbow observed when using a lenticular sheet of the Reference Example.

FIG. 1 is a view showing the shape of 3D structures of a condensing type optical sheet according to a preferred embodiment of the present invention, and FIG. 2 is a cross-sectional view showing the condensing type optical sheet including the 3D structures having the shape of FIG. 1. Also, FIG. 3 is a view showing the shape of 3D structures of a condensing type optical sheet according to another preferred embodiment of the present invention, and FIG. 4 is a cross-sectional view showing the condensing type optical sheet including the 3D structures having the shape of FIG. 3. Also, FIG. 5 is a view showing the shape of 3D structures of a condensing type optical sheet according to a further preferred embodiment of the present invention, and FIG. 6 is a cross-sectional view showing the condensing type optical sheet including the 3D structures having the shape of FIG. 5. Furthermore, FIG. 7 is a view showing the shape of 3D structures of a condensing type optical sheet according to still another preferred embodiment of the present invention, and FIG. 8 is a cross-sectional view showing the condensing type optical sheet including the 3D structures having the shape of FIG. 7.

For the sake of description, the same reference numerals throughout the drawings are used to refer to the same constituents, not to mean that the compositions and forms thereof are the same.

According to a first preferred embodiment of the present invention, a condensing type optical sheet includes a substrate layer 10 and a structural layer 20 formed on one or both surfaces of the substrate layer 10 and having an array of a plurality of three-dimensional (3D) structures, in which each of the 3D structures 25 of the structural layer 20 includes slope portions 21 extending in opposite directions from one peak point in which the slope portions are streamlined when viewed in longitudinal cross-section, and the slope portions 21 are symmetrical or asymmetrical to the peak point and comprise part of a circumference of a first imaginary circle 100 and part of a circumference of a second imaginary circle 200, the first imaginary circle and the second imaginary circle overlapping each other (FIGS. 1 to 4).

According to a second preferred embodiment of the present invention, a condensing type optical sheet includes a substrate layer 10 and a structural layer 20 formed on one or both surfaces of the substrate layer 10 and having an array of a plurality of 3D structures, in which each of the 3D structures 25 of the structural layer 20 includes a peak portion 22 having one peak point and slope portions 21 extending in opposite directions from the peak portion 22 in which the peak portion and the slope portions are streamlined when viewed in longitudinal cross-section, the slope portions 21 are symmetrical or asymmetrical to the peak point and comprise part of a circumference of a first imaginary circle 100 and part of a circumference of a second imaginary circle 200, the first imaginary circle and the second imaginary circle overlapping each other, and the peak portion 22 comprises part of a circumference of a third imaginary circle 300 which is adjacent to the circumference of the first imaginary circle 100 and to the circumference of the second imaginary circle 200 while being included in the overlapping region of the first and second imaginary circles 100, 200 (FIGS. 5 to 8).

According to the first and second preferred embodiments of the present invention, the size and gradient of the 3D structures 25 may be determined depending on the size of the first and second imaginary circles 100, 200 that overlap each other and on how big the region of overlap is.

Specifically, the 3D structures 25 of the structural layer 20 may have a width w corresponding to $1/10 \sim 1$ of a maximum length d between the circumferences at the overlapping region of the first imaginary circle 100 and the second imaginary circle 200 which overlap each other, as viewed in a direction perpendicular to an imaginary line L connecting two intersections of the above two imaginary circles. As such, the maximum length d between the circumferences at the overlapping region of the first imaginary circle 100 and the second imaginary circle 200 as viewed in a direction perpendicular to the imaginary line L connecting the two intersections of the first imaginary circle 100 and the second imaginary circle 200 may be 50~1000 μm, in terms of refracting light so as not to generate a rainbow phenomenon nor a yellow band along with condensing light taking into consideration the path of the light.

In the 3D structures 25 of the structural layer 20, when the width w is primarily determined as above, the height h may be derived therefrom. As such, the height h may be $1/20 \sim 1/2$ of the length of the imaginary line L connecting the two intersections of the first imaginary circle 100 and the second imaginary circle 200, in terms of refracting light so as not to generate a rainbow phenomenon nor a yellow band along with condensing light taking into consideration the path of the light. Specifically, the imaginary line L connecting the two intersections of the first imaginary circle 100 and the second imaginary circle 200 may be 1~1000 μm long.

Although the case where the width of the 3D structures 25 is primarily determined is described as above, the case where the height h of the 3D structures 25 is primarily determined and the width w thereof is then derived therefrom is possible.

Furthermore, the condensing type optical sheet according to the second preferred embodiment of the present invention may include the peak portion 22 which is rounded, in which this peak portion may comprise part of the circumference of the third imaginary circle 300 which is adjacent to the two imaginary circles while being included in the overlapping region of the two imaginary circles constituting the slope portions 21.

The degree of round and size of the peak portion 22 are determined depending on the size and position of the third imaginary circle 300. When the third imaginary circle 300 is positioned within the overlapping region of the first imaginary circle 100 and the second imaginary circle 200, the circumference of the third imaginary circle 300 is adjacent to the circumferences of the first and second imaginary circles 100, 200. Thus, the diameter of the third imaginary circle 300 may be 50 μm or less in consideration of the formation position of the peak portion 22 and the condensing efficiency.

The first imaginary circle 100 and the second imaginary circle 200 may have the same diameter as shown in FIGS. 1 and 5, or may have different diameters as shown in FIGS. 3 and 7. Hence, the 3D structures 25 may be symmetrical or asymmetrical to the peak when viewed in longitudinal cross-section.

The 3D structures 25 of the structural layer 20 may be linearly or non-linearly arrayed.

The 3D structures 25 having such a shape may prevent the generation of a rainbow phenomenon and a yellow band because the angles at which light is incident, refracted and emitted are not the same. Also in the case of a lenticular lens, a rainbow phenomenon and a yellow band are not generated; however, a condensing function is not performed and so luminance is considerably lowered. Whereas, the 3D structures 25 having the above shape may sufficiently provide luminance of or exceeding the level required although not as it is not as much as conventional prism structures provide.

The condensing type optical sheet according to the present invention may be manufactured using typical known methods. Specifically, a solution including a UV curable resin or a thermosetting resin may be applied on one surface of the substrate layer 10 and then cured, thus forming the structural layer 20.

The substrate layer 10 may be formed of a polyethyleneterephthalate resin, a polymethylmethacrylate resin, a polycarbonate resin, a polypropylene resin, a polyethylene resin, a polystyrene resin, or a styrene-acrylic copolymer resin.

The resin material of the structural layer 20 is not particularly limited so long as it is curable and is light transparent. Specifically, any polymer resin including a UV curable resin or a thermosetting resin may be used without limitation, and examples thereof include unsaturated fatty acid esters, aromatic vinyl compounds, unsaturated fatty acids and derivatives thereof, unsaturated dibasic acids and derivatives thereof, and vinyl cyanide compounds such as methacrylonitrile. The type of polymer resin may be determined taking into consideration the refractive index with the substrate layer 10.

The thickness of the substrate layer 10 may be 10~1000 μm, and preferably 15~400 μm, taking into account achieving superior mechanical strength, thermal stability and flexibility and preventing the loss of passed light.

Although not shown, in the case where the structural layer 20 is formed on one surface of the substrate layer 10, a bottom layer may be curably formed on the other surface of the substrate layer 10, and organic or inorganic particles which are known light-diffusing particles may be used therefor.

In addition, the present invention may provide a BLU assembly including the collecting type optical sheet as above, in which the condensing type optical sheet is formed on the uppermost surface thereof and thus there is no need for an additional protective sheet.

MODE FOR INVENTION

A better understanding of the present invention may be obtained via the following examples which are set forth to illustrate, but are not to be construed as limiting the present invention.

Example 1

A substrate layer comprising a 188 μm thick polyethyleneterephthalate film (T600, available from Mitsubishi Com.) (refractive index: 1.49) was used.

In order to design the 3D structures of a structural layer as shown in FIG. 1, a mold was manufactured such that the diameter of each of first and second imaginary circles was 250 μm, the imaginary line L connecting two intersections of the first and second imaginary circles was 200 μm long, the maximum length d between the circumferences at the overlapping region of the first and second imaginary circles as viewed in a direction perpendicular to the imaginary line L connecting the two intersections was 100 μm, and the width w of the 3D structures was 50 μm (½ of d) and the height h thereof was 25 μm (⅛ of L). Then, an acrylic UV curable resin composition (refractive index: 1.58) was added into the mold and cured using UV light and thus a structural layer (refractive index: 1.60) was formed, thereby manufacturing a condensing type optical sheet.

Example 2

A condensing type optical sheet was manufactured in the same manner as in Example 1, with the exception that the imaginary line L connecting the two intersections of the first and second imaginary circles was 225 μm long, the maximum length d between the circumferences at the overlapping region of the first and second imaginary circles as viewed in a direction perpendicular to the imaginary line L connecting the two intersections was 150 μm, and the width w of the 3D structures was 50 μm (⅓ of d) and the height h thereof was 12.5 μm (1/18 of L).

Example 3

A condensing type optical sheet was manufactured in the same manner as in Example 1, with the exception that the diameter of each of first and second imaginary circles was 500 μm, the imaginary line L connecting the two intersections of the first and second imaginary circles was 350 μm long, the maximum length d between the circumferences at the overlapping region of the first and second imaginary circles as viewed in a direction perpendicular to the imaginary line L connecting the two intersections was 150 μm, and the width w of the 3D structures was 50 μm (⅓ of d) and the height h thereof was 25 μm (1/14 of L).

Example 4

A condensing type optical sheet was manufactured in the same manner as in Example 1, with the exception that, as shown in FIG. 5, the 3D structures of the structural layer were designed such that the diameter of a third imaginary circle which is adjacent to the circumferences of the first and second imaginary circles while being positioned within the overlapping region of the first and second imaginary circles was 10 μm, and the height h of the 3D structures was 23 μm.

Example 5

A condensing type optical sheet was manufactured in the same manner as in Example 4, with the exception that the diameter of the third imaginary circle was 20 μm, and the height h of the 3D structures was 21 μm.

Example 6

A condensing type optical sheet was manufactured in the same manner as in Example 1, with the exception that, in order to design the 3D structures of the structural layer as shown in FIG. 3, a mold was manufactured such that the diameters of first and second imaginary circles were respectively 150 μm and 250 μm, the imaginary line L connecting two intersections of the first and second imaginary circles was 145 μm long, the maximum length d between the circumferences at the overlapping region of the first and second imaginary circles as viewed in a direction perpendicular to the imaginary line L connecting the two intersections was 80 μm, and the width w of the 3D structures was 50 μm and the height h thereof was 23 μm, after which an acrylic UV curable resin composition (refractive index: 1.58) was added into the mold and cured using UV light, thus forming a structural layer (refractive index: 1.60).

Example 7

A condensing type optical sheet was manufactured in the same manner as in Example 6, with the exception that, as shown in FIG. 7, the 3D structures of the structural layer were designed such that the diameter of a third imaginary circle adjacent to the circumferences of the first and second imaginary circles while being positioned within the overlapping region of the first and second imaginary circles was 10 μm, and the height h of the 3D structures was 21 μm.

Comparative Example 1

A condensing type optical sheet comprising LC213 (when viewed in longitudinal cross-section, vertical angle: 90°, peak portion (R=1): round shape, pitch: 50 μm, height: 25 μm, available from Kolon) was prepared.

Comparative Example 2

A condensing type optical sheet comprising LC403 (when viewed in longitudinal cross-section, vertical angle of right triangle: 90°, pitch: 50 μm, height: 25 μm, available from Kolon) was prepared.

The condensing type optical sheet of each of the above examples and comparative examples was layered on a diffusion sheet (LX210, available from Kolon), and the properties thereof was evaluated as follows. The results are shown in Table 1 below and FIGS. 9 to 14.

The properties were also evaluated using the same methods for the case where an additional protective sheet (LD243, available from Kolon) was layered on the condensing type optical sheet of Comparative Example 2.

As a Reference Example, a lenticular sheet (L-Grade, available from Kolon) was used instead of the condensing type optical sheets of the above examples and comparative examples, and the properties thereof were evaluated.

(1) Evaluation of Luminance

Each of the condensing type optical sheets of Examples 1~7 and Comparative Examples 1 and 2, the condensing type optical sheet of Comparative Example 2+ the protective sheet, and the lenticular sheet of the Reference Example was mounted to a BLU for a 17" LCD panel as mentioned above, and the luminance values of 13 random points were measured using a luminance meter (BM-7, available from Topcon, Japan) and averaged.

(2) Observations of the Yellow Band

The vicinities close to approximately 40° upon being observed at upper and lower viewing angles and close to approximately 50° upon being observed at the right and left viewing angles were photographed using a digital camera and observed.

(3) Observations of the Rainbow

The area from approximately 40° upon being observed at upper and lower viewing angles up to before the generation position of a side-lobe was photographed using a digital camera and observed.

TABLE 1

|  | Luminance | Yellow Band | Rainbow |
| --- | --- | --- | --- |
| Ex. 1 | 100% | Not Generated | Not Generated |
| Ex. 2 | 80% | Not Generated | Not Generated |
| Ex. 3 | 108% | Generated but Weak | Generated but Weak |
| Ex. 4 | 95% | Not Generated | Not Generated |
| Ex. 5 | 90% | Not Generated | Not Generated |
| Ex. 6 | 87% | Not Generated | Not Generated |
| Ex. 7 | 82% | Not Generated | Not Generated |
| C. Ex. 1 | 111% | Generated | Generated |
| C. Ex. 2 | 109% | Generated | Generated |
| C. Ex. 2 + Protective Sheet | 105% | Not Generated | Not Generated |
| Ref. Ex. | 81% | Not Generated | Not Generated |

The evaluation of the properties as above showed that the condensing type optical sheets according to the present invention do not generate the yellow band or the rainbow phenomenon while maintaining a luminance equivalent to that of when the protective sheet is layered on the conventional prism sheet.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A condensing type optical sheet, comprising:
a substrate layer, and a structural layer formed on one surface or both surfaces of the substrate layer and having an array of a plurality of three-dimensional structures,
wherein each of the three-dimensional structures of the structural layer includes a pair of a first slope portion and a second slope portion, each slope portion extending in opposite directions from one peak point where the first slope portion and the second slope portion meet, in which the slope portions are streamlined when viewed in longitudinal cross-section,
wherein the first and the second slope portions are asymmetrical to the peak point and the first slope portion comprises a part of a circumference of a first imaginary circle and the second slope portion comprises a part of a circumference of a second imaginary circle, the first imaginary circle and the second imaginary circle overlapping each other, and
wherein the three-dimensional structures of the structural layer have a width corresponding to ⅒-1 of a maximum length between the circumferences at the overlapping region of the first imaginary circle and the second imaginary circle as viewed in a direction perpendicular to an imaginary line connecting two intersections of the first imaginary circle and the second imaginary circle.

2. The condensing type optical sheet according to claim 1, wherein the maximum length between the circumferences at the overlapping region of the first imaginary circle and the second imaginary circle as viewed in a direction perpendicular to the imaginary line connecting the two intersections of the first imaginary circle and the second imaginary circle is 50-1000 µm.

3. The condensing type optical sheet according to claim 1, wherein the three-dimensional structures of the structural layer have a height corresponding to ¹⁄₂₀-½ of a length of the imaginary line connecting the two intersections of the first imaginary circle and the second imaginary circle.

4. The condensing type optical sheet according to claim 3, wherein the length of the imaginary line connecting the two intersections of the first imaginary circle and the second imaginary circle is 1-1000 µm.

5. The condensing type optical sheet according to claim 1, wherein the three-dimensional structures of the structural layer have a linear array or a non-linear array.

6. The condensing type optical sheet according to claim 1, wherein the substrate layer is formed using a resin selected from among a polyethyleneterephthalate resin, a polymethylmethacrylate resin, a polycarbonate resin, a polypropylene resin, a polyethylene resin, a polystyrene resin, and a styrene-acrylic copolymer resin.

7. The condensing type optical sheet according to claim 1, wherein the structural layer is formed using a resin selected from among polymer resins including UV curable resins and thermosetting resins.

8. A backlight unit assembly, comprising:
a diffusion sheet; and
the condensing type optical sheet of claim 1.

9. A condensing type optical sheet, comprising:
a substrate layer, and a structural layer formed on one surface or both surfaces of the substrate layer and having an array of a plurality of three-dimensional structures,
wherein each of the three-dimensional structures of the structural layer includes a peak portion having one peak point and a pair of a first slope portion and a second slope portion, each slope portion extending in opposite directions from the peak portion where the first slope portion and the second slope portion meet, in which the peak portion and the slope portions are streamlined when viewed in longitudinal cross-section,
wherein the first and the second slope portions are symmetrical or asymmetrical to the peak point and the first slope portion comprises a part of a circumference of a first imaginary circle and the second slope portion comprises a part of a circumference of a second imaginary circle, the first imaginary circle and the second imaginary circle overlapping each other,
wherein the peak portion comprises a part of a circumference of a third imaginary circle which is adjacent to the circumference of the first imaginary circle and to the circumference of the second imaginary circle while being included in an overlapping region of the first imaginary circle and the second imaginary circle, and
wherein the peak portion is connected with the slope portions, and the third imaginary circle has a diameter of 50 µm or less.

10. The condensing type optical sheet according to claim 9, wherein the three-dimensional structures of the structural layer have a width corresponding to ⅒-1 of a maximum length between the circumferences at the overlapping region of the first imaginary circle and the second imaginary circle as viewed in a direction perpendicular to an imaginary line connecting two intersections of the first imaginary circle and the second imaginary circle.

11. The condensing type optical sheet according to claim 10, wherein the maximum length between the circumferences at the overlapping region of the first imaginary circle and the second imaginary circle as viewed in a direction perpendicular to the imaginary line connecting the two intersections of the first imaginary circle and the second imaginary circle is 50-1000 μm.

12. The condensing type optical sheet according to claim 9, wherein the three-dimensional structures of the structural layer have a height corresponding to $\frac{1}{20}$-$\frac{1}{2}$ of a length of the imaginary line connecting the two intersections of the first imaginary circle and the second imaginary circle.

13. The condensing type optical sheet according to claim 12, wherein the length of the imaginary line connecting the two intersections of the first imaginary circle and the second imaginary circle is 1-1000 μm.

14. The condensing type optical sheet according to claim 9, wherein the three-dimensional structures of the structural layer have a linear array or a non-linear array.

15. The condensing type optical sheet according to claim 9, wherein the substrate layer is formed using a resin selected from among a polyethyleneterephthalate resin, a polymethylmethacrylate resin, a polycarbonate resin, a polypropylene resin, a polyethylene resin, a polystyrene resin, and a styrene-acrylic copolymer resin.

16. The condensing type optical sheet according to claim 9, wherein the structural layer is formed using a resin selected from among polymer resins including UV curable resins and thermosetting resins.

17. A backlight unit assembly, comprising:
 a diffusion sheet; and
 the condensing type optical sheet of claim 9.

* * * * *